Oct. 14, 1969      H. R. HELLSTROM      3,472,368
QUICK-OPENING BLISTER PACKETS
Filed Oct. 4, 1968      3 Sheets-Sheet 1
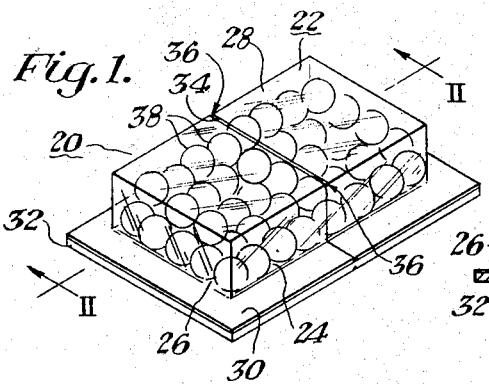
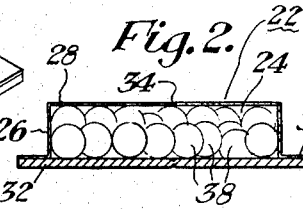
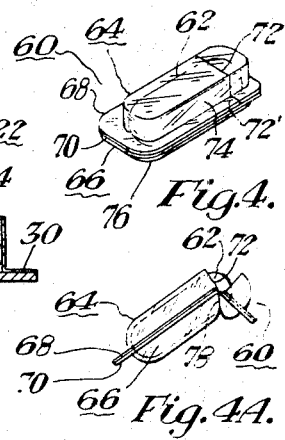
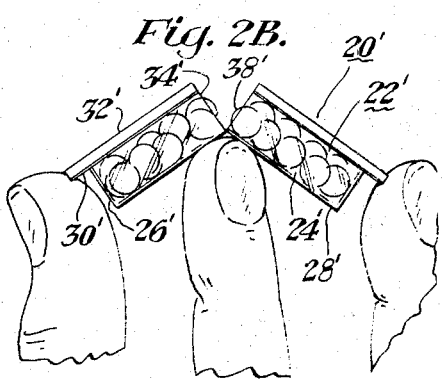
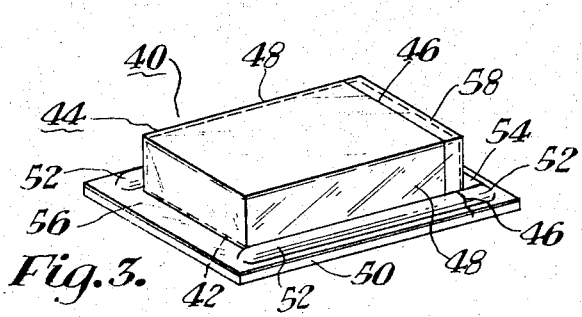
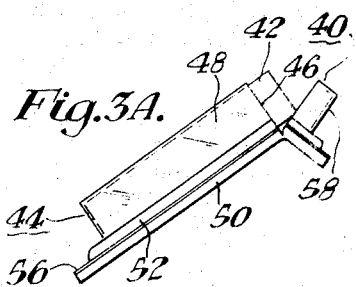
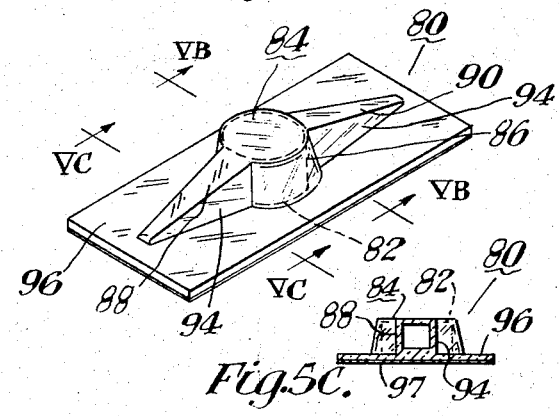
INVENTOR
Harold R. Hellstrom
BY
HIS ATTORNEYS Oct. 14, 1969 H. R. HELLSTROM 3,472,368
QUICK-OPENING BLISTER PACKETS
Filed Oct. 4, 1968 3 Sheets-Sheet 2
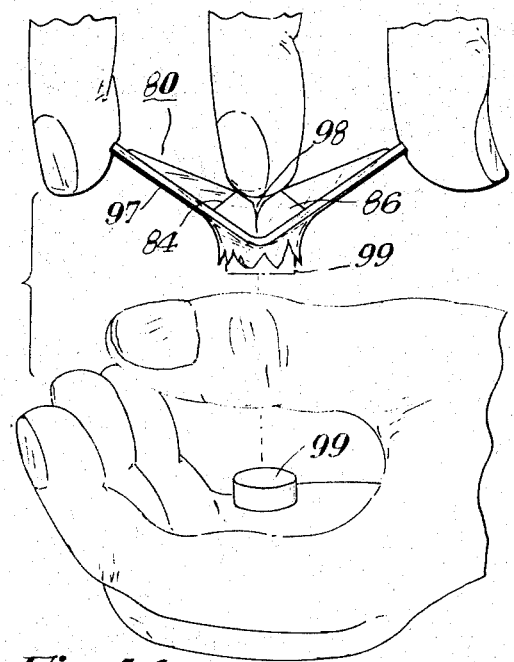
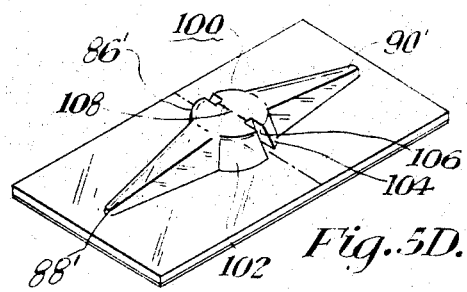
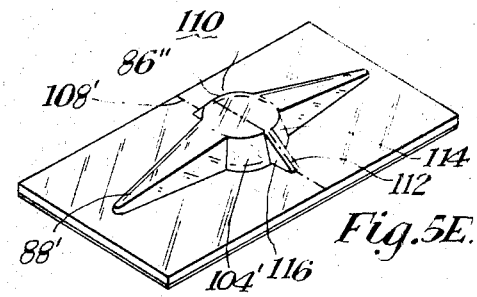
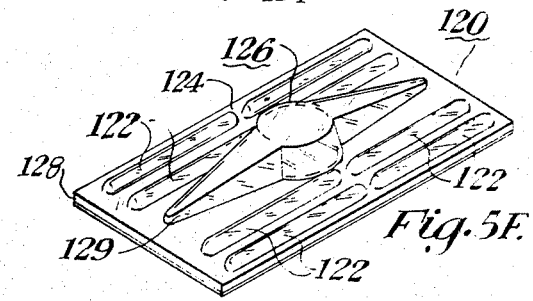
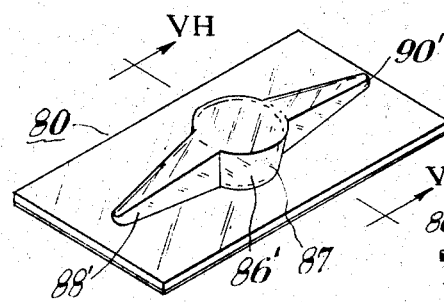
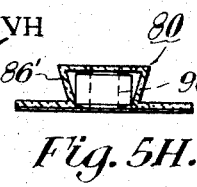
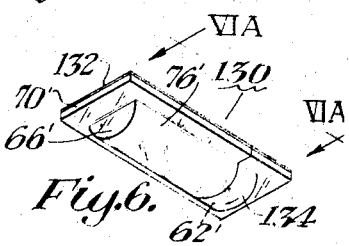
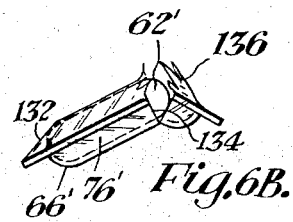
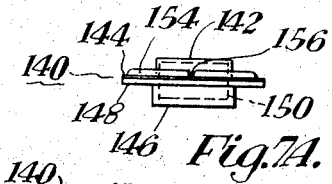
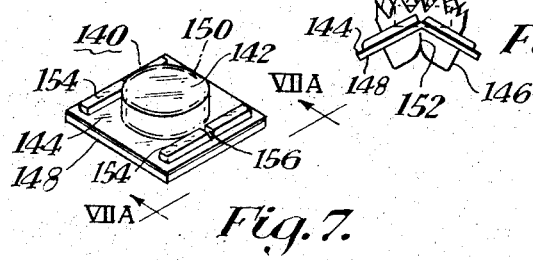
INVENTOR
Harold R. Hellstrom.
BY
HIS ATTORNEYS Oct. 14, 1969   H. R. HELLSTROM   3,472,368
QUICK-OPENING BLISTER PACKETS
Filed Oct. 4, 1968   3 Sheets-Sheet 3

INVENTOR
Harold R. Hellstrom.
BY
HIS ATTORNEYS

United States Patent Office 3,472,368
Patented Oct. 14, 1969

3,472,368
QUICK-OPENING BLISTER PACKETS
Harold R. Hellstrom, 5245 Center Ave.,
Pittsburgh, Pa. 15232
Filed Oct. 4, 1968, Ser. No. 765,097
Int. Cl. B65d 17/24
U.S. Cl. 206—56                                  19 Claims

ABSTRACT OF THE DISCLOSURE

I disclose a quick-opening blister packet comprising a freestanding blister, a peripheral sealing flange secured to said blister, a backing member adhered to said blister flange, means on at least one of said blister and said backing member for defining an angulation fold line in one of said blister and said backing member, said blister having upstanding relatively rigid side walls extending transversely of said fold line for stiffening said backing member and said flange for angulation purposes.

This application is an improvement upon my copending applications entitled "Individualized Dispensing Packages" filed Mar. 27, 1968, Ser. No. 716,554 and "Quick-Opening Package" filed May 1, 1968, Ser. No. 725,610.

The present invention relates to quick-opening blister packets and more particularly to individualized or compartmentized packets capable of being opened with one hand of the user.

The merits of a quick-opening package, particularly one which can be opened with one hand, have been elaborated upon in detail in my aforementioned co-pending applications. Briefly, these include the avoidance of dropping or otherwise contaminating the contained item or items, dispensing an article directly into the place of use, i.e. a patient's mouth when the article is a pill or capsule, dispensing the item directly into a patient's or other user's hand, dispensing the item directly into a water tumbler or the like held by the patient or by an individual administering to him, and the presence of relatively smooth surfaces for labeling purposes. Additionally, fumbling for strings, tapes, tear slits, peelable covers, and other opening "aids" is avoided.

Examples of such opening means are shown in the United States patents to Baermann et al. 3,301,394; Regan, Jr. 3,301,392; Scrivens 3,061,087; Wayne 3,069,273; and Hey et al. 3,192,091, each of which shows a packet or container in which a backer strip or tab must be peeled away from the container for opening purposes. Prior examples of various types of free-standing blister packages are legion. These uniformly require considerable difficulty in opening without spilling, soiling or damaging the contents. In most cases the blister or the backing cardboard must be physically torn—a difficult task especially with small packages. Some improvement is offered by Neary 2,884,127 (FIGURE 11), which discloses a blister package having a severable blister. The Neary package, however, requires two hands for opening purposes and in addition the perforated blister prevents sealing.

A shrunk plastic packet is shown in Potter 3,215,267 where lifting the packet 10 from the cardboard backer 18 opens the shrunk plastic film surrounding the article. Here again, the package cannot be opened with one hand. Additionally, the Potter package is not adaptable for frangible items as the plastic film is shrunk upon the item and therefore is not free standing for protectional purposes.

The individualized packages disclosed in my first-mentioned co-pending application for the most part result in a relatively large expanse of unsupported frangible membrane. While this clearly is not a disadvantage in many applications, for very small items, such as certain pills or capsules, or tiny machine, electrical or jewelry components, the membrane structure dictates a minimum distance between items within a strip package or similar compartmented package. Additionally, in the case of frangible or easily crushed items, the relatively stiff backing member requires molding thereof to a particular shape or, alternatively, the use of auxiliary components in the package for the protection of the item.

The quick-opening packages disclosed in my second-mentioned co-pending application reduce considerably the minimum distance between the items of a strip or compartmented package. Considerable protection to the contained items is offered by the relatively closely fitting packages disclosed therein. However, in certain applications auxiliary means outside of the blister or bubble containing the item are required to strengthen the package for angulation and opening purposes. Usually large or thick items, or a plurality of small items, are accommodated in the packages of my second-mentioned application with somewhat greater difficulty than is desirable.

I overcome the disadvantages of the prior art described herein and in my earlier co-pending application identified above and I improve upon the packages described and claimed in my aforementioned co-pending applications by providing a quick-opening blister packet in which the blister (and the item contained therein) can be made to cover a corresponding larger proportion of the usual backing layer or member forming part of such packages. Thus larger items or a number of small items can be accommodated within a given overall package size. Similarly, the package size can be considerably reduced for certain shapes of small items.

Means are also disclosed for utilizing wall sections of the blister or bubble for reinforcing the backing layer for angulation purposes. In consequence, the backing layer can be made from corresponding thinner or weaker material or alternatively some or all of angulation reinforcement means can be eliminated.

I also provide a quick-opening blister packet wherein a relatively large or thick item can be enclosed in a pair of back-to-back pocket blister or bubble structures. At least one of the back-to-back structures is provided with angulation reinforcing means such that a frangible section of one of the structures is ruptured upon angulating the package. As in my predecessor inventions the quick-opening blister packets of the present invention can be quickly, conveniently, and easily opened with one hand. The required opening forces, however, can be increased, in accordance with the teachings of my first-mentioned co-pending application in order to "childproof" the blister packets disclosed herein.

I accomplish these desirable results by providing a quick-opening blister packet comprising a free standing blister, a peripheral sealing flange secured to said blister, a backing member adhered to said blister flange, means on at least one of said blister and said backing member for defining an angulation fold line in one of said blister and said backing member, said blister having upstanding relatively rigid side walls extending transversely of said fold line for stiffening said backing member and said flange for angulation purposes.

I also desirably provide a similar quick-opening packet wherein said blister is provided with a line of weakening so that said blister is parted along said line upon rearward angulation of said backing member.

I also desirably provide a similar quick-opening packet wherein said blister flange and said blister side walls are provided with a line of weakening so that said side walls and said flange are parted upon forward angulation of said backing member to sever said backing member.

I also desirably provide a similar quick-opening packet wherein joined areas of said flange and said backing member are provided with additional stiffening means for angulation purposes.

I also desirably provide a similar quick-opening packet wherein said blister is compartmented into a first section containing said item and into at least one stiffening section joined to said first section for stiffening said packet for angulation purposes.

During the foregoing discussion, various objects, features and advantages of the invention have been set forth. These and other objects, features and advantages of the invention together with structural details thereof will be elaborated upon during the forthcoming description of presently preferred embodiments of the invention and presently preferred methods of practicing the same.

In the accompanying drawings I have shown certain presently preferred embodiments of the invention and have illustrated presently preferred methods of practicing the same, wherein:

FIGURE 1 is an isometric view of one form of quick-opening blister packet of my invention;

FIGURE 2 is a longitudinally sectioned view of the package shown in FIGURE 1 and taken along reference line II—II thereof;

FIGURE 2A is a similar view showing the packet of FIGURE 2 in its opened position;

FIGURE 2B is a similar view showing the open position of a similar packet;

FIGURE 3 is an isometric view of another form of quick-opening blister packet of my invention;

FIGURE 3A is a longitudinally sectioned view of the packet of FIGURE 3 in its opened condition;

FIGURE 4 is an isometric view of still another form of my quick-opening blister packet;

FIGURE 4A is a longitudinally sectioned view of the packet of FIGURE 4 in its opened condition;

FIGURE 5 is a longitudinally sectioned view of still another arrangement of my quick-opening blister packet;

FIGURE 5A is a longitudinally sectioned view of the packet of FIGURE 5 in its opened condition;

FIGURE 5B is a cross sectional view of the packet of FIGURE 5 taken along reference line VB—VB thereof;

FIGURE 5C is another cross sectional view of the packet of FIGURE 5 taken along reference line VC—VC thereof;

FIGURE 5D is an isometric view of a modification of the quick-opening packet of FIGURE 5;

FIGURE 5E is an isometric view of still another modification of the packet of FIGURE 5;

FIGURE 5F is an isometric view of a further modification of the blister packet of FIGURE 5;

FIGURE 5G is an isometric view of a further modification of the blister packet of FIGURE 5;

FIGURE 5H is a cross sectional view of the packet of FIGURE 5G and taken along reference line VH—VH thereof;

FIGURE 6 is an isometric view of a modification of the blister packet of FIGURE 4;

FIGURE 6A is a longitudinally sectioned view of the packet of FIGURE 6 and taken along reference line VIA—VIA thereof;

FIGURE 6B is a similar longitudinally sectioned view but showing the packet of FIGURE 6A in its open condition;

FIGURE 7 is an isometric view of still another form of my novel blister packet;

FIGURE 7A is an elevational view of the packet of FIGURE 7;

FIGURE 7B is a sectional view showing the packet of FIGURE 7A in its open condition;

Figure 8:
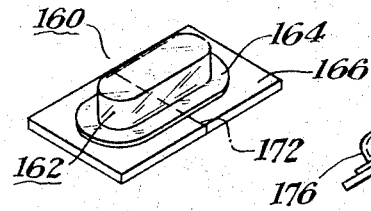
FIGURE 8 is an isometric view of still another form of my blister packet.

Referring now to FIGURES 1, 2 and 2A of the drawings, my novel quick-opening blister packet 20 shown therein comprises a free standing or self-supporting blister 22 having, in this example, upstanding side walls 24 and 26 adjoined to a substantially flat top wall 28. The opposite lateral edges of the side walls 24, 26 are joined to a continuous sealing flange 30 whereby the blister 22 is joined to a backing member 32 by means of gluing, cementing, heat sealing, solvent welding, or the like. In a typical form of my invention, the blister 22 is fabricated from a formed transparent plastic sheet, while the backing member 32 is made from a relatively thin cardboard which can be plastic coated for heat sealing purposes. Alternatively, the backing member 32 can be made of paper or aluminum or other suitable material. Desirably, the backing member 32 is made from a material on which printed instructions or the like can be applied to the front and/or back without undue difficulty.

For angulation purposes, presently to be described with reference to FIGURE 2A, the upstanding walls 24, 26 serve as stiffening means for the backing member 32. The backing member can be provided with additional stiffening means such as shown in FIGURE 3 or with inherent strength by making the backing member 32 from relatively stiff cardboard or plastic.

The blister 22 is provided with a line of weakening 34 which can be a score line, thinner portion, or the like extending, in this example, transversely across the top wall 28 of the blister and preferably across adjoining portions of the vertical walls 24 and adjacent portions of the continuous sealing flange 30. Thus, when the package 20 is angulated (FIGURE 2A), considerable parting forces are applied at the line of weakening 34 in the top wall 28 and the side walls 24 of the blister 22. These forces initially are greatest at the intersections at the line of weakening 34 with the lateral corners (arrows 36) at the top wall 28. As a result, parting of the blister 22 occurs initially at the points 36 and then spreads rapidly across the top wall 28 and down the side walls 24 (as viewed in the drawings) along the line of weakening 34, when the package 20 is angulated to its open position as shown in FIGURE 2A. The packet of FIGURE 2A can then be inverted to remove one or more of the contained items 38.

Alternatively, as shown in FIGURE 2B, the package 20' can be opened by angulation in the opposite direction so that the bubble or blister 22' hinges about its top wall section 28. In the arrangement of FIGURE 2B, that portion of the line of weakening 34 (FIGURES 1 and 2) extending across the top wall 28' can be omitted, and instead, can be extended across the backing member 32'. When the package 20' is opened, parting commences at the blister flange 30' and then proceeds across the upstanding side walls 24' to rupture the backing member 32'. In furtherance of this purpose, the blister flange 30' can be partially slit along the line of weakening 34' with the slits terminating short of the side walls 24 respectively to maintain the sealed integrity of the package 20'. The package 20' of FIGURE 2B likewise can be inverted to remove one or more of the contained items 38'. Either of the packages of FIGURES 2A and 2B can be straightened to the position shown in FIGURE 2 to contain the remaining items if desired.

Most importantly, whether the package is angulated forwardly (FIGURE 2B) or rearwardly (FIGURE 2A), the package 20 or 20' can be readily opened with the use of one hand as shown.

A similar quick-opening blister packet 40 is illustrated in FIGURES 3 and 3A and is modified for use in packaging a single, larger item 42, although the packet 40 obviously can be used to contain a plurality of small items, such as the items 38 or 38' of the preceding figures. In the arrangement of FIGURES 3 and 3A, the blister 44 likewise is of the freestanding variety and is generally similar to the blister 22 of FIGURES 1 and 2, with the exception that the line of weakening 46 is placed near the end of the package, so that the item 42 does not interfere with angulation and opening of the packet 40, as shown in FIGURE 3. The packet 40 thus can be readily opened with the fingers of one hand and without risk of any damage to the contained item 42, which may be a fragile item, as the item 42 need not be closely fitted within the freestanding blister 44. Alternatively (not shown) the package 40 can be opened by angulation in the opposite direction after the manner of FIGURE 2B.

Stiffening of the packet 40 for angulation purposes can be afforded, if desired, entirely by the side walls 48 of the blister 44, as set forth in the preceding figures. Additional stiffening can be incorporated inherently in the backing member 50 by fabricating this member from a heavy cardboard material or from a relatively stiff plastic.

Alternatively, as shown in FIGURES 3 and 3A, a series of flutes or ribs or other elongated stiffening members 52, 54 can be secured to the blister flange 56 or to the adjacent opposite surfaces of the backing member 50. In this example, the stiffening members are provided by fluting or shaping the blister flange 56 as shown, preferably when the blister is molded or otherwise formed. The flutes 52, 54 are spaced from the adjacent junction of the blister flange 56 with the side walls 48 and adjacent end wall 58 to leave a sealing area to maintain the sealed integrity between the blister 44 and the backing member 50.

A similar packet 60 is illustrated in FIGURES 4 and 4A of the drawings and is designed to contain a relatively thicker item 62. In furtherance of this purpose, a pair of blisters 64, 66 having respectively circumferential flanges 68, 70 are secured and sealed back-to-back by heat sealing, solvent welding, gluing, or otherwise adhering the flanges 68, 70. One of the blisters, for example the upper blister 64 as viewed in the drawings, is provided with a line of weakening 72 similar to the line of weakening 46 of FIGURES 3 and 3A. The upstanding walls 74, 76 respectively of the blisters 64, 66 cooperate in stiffening the package 60 for angulation purposes.

When the package 60 is angulated as shown in FIGURE 4A (with the fingers of one hand—not shown), the lower blister 66 is folded and the upper blister 64 is parted along the line of weakening 72.

Alternatively, as denoted by chain line 72' (FIGURE 4), each of the back-to-back blisters 64, 66 can be provided with a line of weakening 72 or 72' so that the package 60 can be angulated in either direction and to facilitate the folding 78 of the other blister, for example the blister 66 (FIGURE 4A).

With reference now to FIGURES 5 through 5C of the drawings still another form 80 of my quick-opening blister packet is shown and is arranged primarily for containing a single item 82 in a modified, freestanding blister formation 84. In this arrangement, the blister 84 is compartmented into an item containing section 86 and strengthening sections 88, 90. The item containing section, as better shown in FIGURE 5B, desirably is provided with slanted side walls 92 to facilitate folding of the central item containing section or compartment 86 when the packet 80 is angulated as in FIGURE 5A. On the other hand, the strengthening sections 88, 90 desirably are provided with upstanding side walls 94 in order to stiffen the packet 80 for angulation purposes. In furtherance of this purpose, the blister 84 desirably is provided with a relatively stiff circumferential flange 96 to which a frangible backing member 97 is adhered and preferably sealed. The backing member 97 can be made from paper, aluminum foil, or frangible plastic sheet and can be provided with a line of weakening (not shown) if desired.

When the packet 80 is angulated (FIGURE 5A) the central or item containing section 86 of the blister 84 is folded at 98 and aids in rupturing the frangible backing 97 and ejecting the contained item 99, which may be caught in the other hand of the user as shown in FIGURE 5A. Alternatively, the packet 80 can be provided with a line of weakening (not shown) extending across the item containing blister portion 86, after the manner of the preceding figures, and the packet 80 can be opened by angulating in the opposite direction after the matter of FIGURE 2B.

A similar quick-open packet 100 is shown in FIGURE 5D of the drawings wherein central section 86' of blister 102 is provided with upstanding side walls 104 (for stiffening purposes), each of which is provided with a notched portion or inward protrusion 106. The packet 100 of FIGURE 5D likewise can be opened by angulation in either direction with the central blister section 86' either folding or parting along chain line 108 as the case may be. In the event that it is desired to part the blister portion 86' by angulating rearwardly, the chain line 108 desirably represents a line of weakening such as that described with respect to the earlier figures of the drawings.

A similar packet 110 is shown in FIGURE 5E of the drawings wherein each of the side walls 104' of the central blister compartment 86" is provided with an outward protrusion 112. Blister 114 can be similarly folded or parted along chain line 108'. For this purpose, angulation of the packet 110 is facilitated by the slanted wall sections 116 of the protrusions 112 which obviate the strengthening otherwise afforded on either side of chain line 108' by the upstanding walls 104' and the strengthening compartments 88' of the blister 114'.

The quick-opening packet 120 of FIGURE 5F is similar in construction to the packet 80 of FIGURES 5 through 5C with the exception that additional stiffening of the packet 120 is afforded by stiffening members 122. The stiffeners 122 desirably are molded integrally as flutes in circumferential flange 124 of blister 126. Alternatively, the stiffeners 122 can be applied as discreet elongated members by gluing or otherwise adhering to the blister flange 124 or to the juxtaposed surfaces of the backing member 128, on the other side of the packet 126. Desirably, the stiffeners or flutes 122 extend generally parallel with blister stiffening sections or compartments 129. The packet 120 can be opened by angulating in either direction after the manner described previously.

The packet 120' of FIGURES 5G and 5H is similar to that of FIGURES 5–5C, save that walls 87 of the central item-containing section 86' are slanted inwardly, as better shown in FIGURE 5H, to facilitate angulation (FIGURE 5A).

A modified back-to-back packet 130 is disclosed in FIGURES 6, 6A and 6B of the drawings wherein a lower blister 66' is provided with a relatively rigid circumferential flange 70' to which is applied a membrane 132 somewhat after the fashion of the packaging arrangement disclosed and claimed in my first mentioned application. The membrane or bubble 132 is lightly stretched over the protruding surfaces of the contained item 62' as better shown in FIGURE 6A. The membrane 132 can be joined to the perimetric edges of the circumferential flange 70' by gluing or heat sealing or the like, as set forth in my co-pending application.

The back-to-back bubble-blister packet 130 is opened by angulating the packet as shown in FIGURE 6B. In furtherance of this purpose, the blister 66', which desirably is relatively rigid, is provided with a line of weakening 134 extending transversely across the blister 66' and across its circumferential flange 70'. To facilitate parting of the blister flange and side walls 76', the flange can be partially slit as described in connection with FIGURE 2B of the drawings. When the package is thus opened (FIGURE 6B) the membrane 132 is stretched over the item 62' and is likewise ruptured at 136 and, in furtherance of this purpose, may be provided with a line of weakening extending thereacross and juxtaposed to the line of weakening 134 in the blister 66'. The membrane line of weakening can be formed in accordance with any of the arrangements shown in my first-mentioned co-pending application.

A similar back-to-back blister packet 140 is illustrated in FIGURES 7, 7A and 7B. In this arrangement a relatively thin blister 142 having a circumferential flange 144 is adhered to a relatively thicker blister 146 with a similar flange 148. The blister flanges 144, 148 desirably are adhered by one of the methods mentioned previously. A contained item 150 desirably protrudes into each of the blisters 142, 146. As better shown in FIGURE 7B, the packet 140 is opened by angulating the blister flanges 144, 148 (at least one of which is sufficiently stiff for this purpose) toward the thicker blister member 146. The latter can fold at 152 to at least partially aid in ejecting the item 150, depending on the shape of the contained item. The outer blister 142 is stretched over the item 150 and is ruptured as shown in FIGURE 7B. Alternatively, one or both of the blisters can be provided with a line of weakening (not shown) to facilitate rupturing or folding of the associated blister or blisters.

Additional stiffening can be afforded the flanges by flutes or other stiffeners 154 molded in or otherwise secured to the flanges 144, 148. Desirably, the flutes are notched at 156 to facilitate angulation of the packet 140.

Figure 8A:
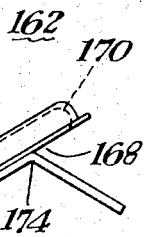
FIGURE 8A is a longitudinally sectioned view of the packet of FIGURE 8 in its open condition.

Another arrangement of my quick-opening angulated packet 160 is illustrated in FIGURES 8 and 8A of the drawings. In this arrangement, a free-standing blister 162 having a relatively narrow circumferential sealing flange 164 is adhered by means of its flange to a relatively stiff backing member 166. Desirably, the flange 164 is coated on the side adjacent the backing member 166 with a frangible or pressure sensitive type cement whereby the blister 162 is frangibly adhered and sealed to the backing member 166. To open the packet 160 the backing member 166 is angulated along chain reference line 172 and, if desired, can be provided with a line of weakening coinciding with the chain line 172. The angulation fold 174 (FIGURE 8A) can be disposed closer to the adhered end 176 of the blister 162 where it is desired to provide a larger opening 168.

Figure 8B:
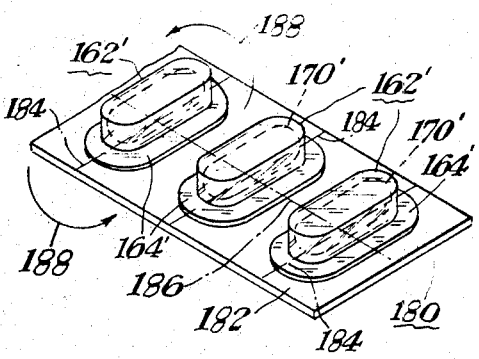
FIGURE 8B is an isometric view of a modification of the blister packet of FIGURE 8.

A similar packet 180 is illustrated in FIGURE 8B of the drawings and is arranged in this example in the form of a strip package. The quick-opening packet 180 includes a plurality of free-standing blisters 162' joined in this example to a continuous or common backing member or strip 182. Each of the blisters 162' is likewise frangibly joined by means of its circumferential flange 164' to the backing strip 182 and can be removed in a manner similar to that shown in FIGURE 8A.

More conveniently, however, the blisters 162 and the items 170' contained therein can be successively removed by angulating the strip 182 more or less longitudinally of the blister 162' for example along chain lines 184. Alternatively, the blisters 162' can be removed by angulating adjacent portions of the backing strip 182 along a common, longitudinal fold line 186. Any of the fold lines 184 or 186 can be precreased or scored or otherwise provided with a line of weakening.

It is also contemplated that any one of the blisters 162' and contained item 170' can be removed by twisting as denoted by arrows 188 to sever the frangible seal between the blister flange 164' and the adjacent portion of the backing strip 182.

It is also contemplated that the flat-backed blister packets of FIGURES 1, 3, 5, 8, and 9 and related figures can be arranged in the form of back-to-back blisters (after the fashion of FIGURES 4, 6, or 7).

Figure 9A:
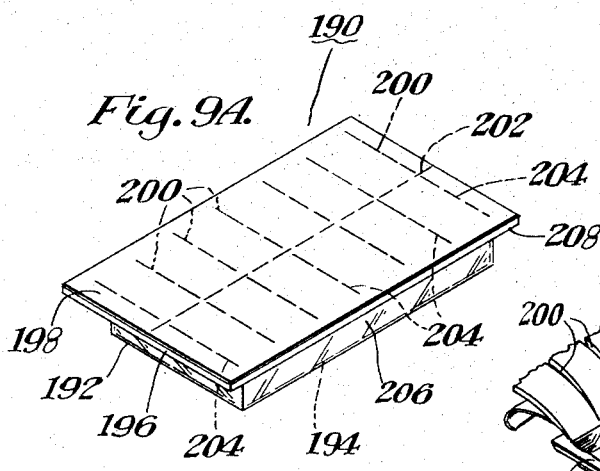
FIGURE 9A is an isometric view of the packet of FIGURE 9 in its open condition.
Figure 9B:
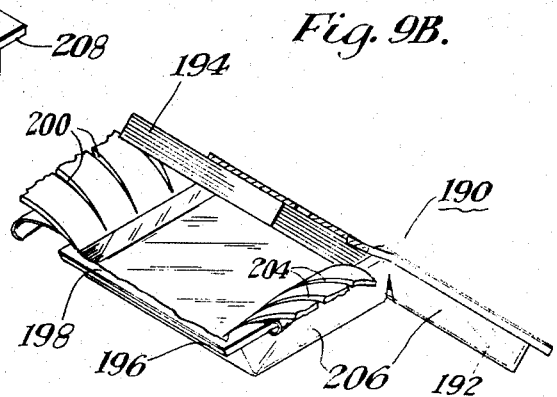
FIGURE 9 is an isometric view of a modification of the blister packet as shown in FIGURES 1 and 2.

The blister packet 190 of FIGURES 9 and 9A is arranged to permit a more or less central angulation thereof, although blister 192 contains a relatively large single item 194. Packet 190 also illustrates use of a relatively heavy cardboard backing 196 suitable for the application of aluminum foil 198 or the like for decorative or sealing purposes. To facilitate angulation and rupture of the heavier backing 196 transverse and longitudinal lines of weakening such as scores or slits 200, 202 are applied thereto. The emergence of the item 194 upon angulation of the packet 190 (FIGURE 9A) and rupture of the backing 196 along lines 200, 202 (FIGURE 9A) can be further facilitated with additional lines 204 of weakening in the backing 196.

When the packet 190 is opened, the upstanding side walls 206 and flanges 208 of the relatively rigid, free-standing blister 192 stiffens the backing 196 for angulation purposes. When the backing layer 196 is ruptured, the aluminum foil 198, when used, also ruptures.

From the foregoing it will be apparent that novel and efficient forms of quick-opening blister packets have been shown and described herein. While I have shown and described certain presently preferred embodiments of the invention and have illustrated certain presently preferred methods of practicing the same.

I claim:
1. A quick-opening blister packet comprising a free-standing blister capable of containing at least a portion of at least one item therein, a peripheral sealing flange secured to said blister, a backing member adhered to said blister flange, means on at least one of said blister and said backing member for defining an angulation fold line in one of said blister and said backing member, said blister having upstanding relatively rigid side walls extending transversely of said fold line for stiffening said backing member and said flange for angulation purposes.

2. The combination according to claim 1 wherein said blister is provided with a line of weakening so that said blister is parted along said line upon rearward angulation of said backing member.

3. The combination according to claim 1 wherein said blister flange and said blister side walls are provided with a line of weakening so that said side walls and said flange are parted upon forward angulation of said backing member to sever said backing member.

4. The combination according to claim 1 wherein joined areas of said flange and said backing member are provided with additional stiffening means for angulation purposes.

5. The combination according to claim 1 wherein said blister is elongated and encloses a single contained item, and said line of weakening is applied adjacent one end of said blister so that said contained item does not interfere with angulation of said packet.

6. The combination according to claim 1 wherein said backing member is a complementarily shaped blister having a peripheral flange sealed to the first blister flange to enclose said item therebetween, and a line of weakening is formed in at least one of said blisters for parting of said blister when said packet is angulated toward the other of said blisters.

7. The combination according to claim 6 wherein a similarly placed line of weakening is formed in each of said blisters so that said packet can be angulated in either direction with one of said lines facilitating parting of the associated one of said blisters and the other of said lines facilitating folding of the other of said blisters.

8. The combination according to claim 1 wherein said blister is compartmented into a first section containing said item and into at least one stiffening section joined to said first section for stiffening said packet for angulation purposes.

9. The combination according to claim 8 wherein at least the side walls of said stiffening section are upstanding relative to said flange and said backing member, and at least opposed sections of the side walls of said first blister section are slanted relative to said flange and said backing member to facilitate folding of said first blister section for angulation purposes.

10. The combination according to claim 8 wherein the adjoined portions of said flange and said backing member are provided with stiffening means for stiffening said packet for angulation purposes, said stiffening means extending generally parallel to said blister stiffening section.

11. The combination according to claim 1 wherein said contained item protrudes from said blister and projects outwardly of said sealing flange, and said backing member is peripherally joined to said sealing flange and is lightly stretched over the protruding portions of said item, said backing member being a frangible membrane rupturable upon said angulation.

12. The combination according to claim 4 wherein said stiffening means include stiffening members extending transversely of said angulation fold.

13. The combination according to claim 12 wherein said stiffening members are notched at points of their intersection with said angulation fold.

14. The combination according to claim 1 wherein said blister flange is secured to said backing member by means of a frangible cement or glue, and a portion of the junction thus formed between said flange and said backing member is severed upon angulation of said backing member to open said packet.

15. The combination according to claim 14 wherein a plurality of blister and contained items are adhered to a common backing member.

16. The combination according to claim 15 wherein said backing member is provided with fold means adjacent each of said blisters to facilitate angulation of adjacent portions of said backing member.

17. The combination according to claim 15 wherein the frangible seal between each of said blisters and said backing member is capable of severance by twisting said blister to remove said blister from said backing member.

18. The combination according to claim 1 wherein said item substantially fills said blister, said fold line is centrally of said backing member, and said backing member is provided with at least one additional line of weakening to facilitate rupture thereof and emergence of said item.

19. The combination according to claim 18 wherein said backing member and said fold line and said line of weakening are covered with a layer of metallic foil for sealing purposes.

References Cited

UNITED STATES PATENTS

| | | | |
|---|---|---|---|
| 3,207,299 | 9/1965 | Sparks | 206—56 |
| 3,261,538 | 7/1966 | Jones et al. | 229—87 |

JAMES B. MARBERT, Primary Examiner

U.S. Cl. X.R.

206—38